United States Patent [19]

Anthony, Jr. et al.

[11] Patent Number: 4,709,328
[45] Date of Patent: Nov. 24, 1987

[54] COMPOSITE DATA-PROCESSING SYSTEM USING MULTIPLE STANDALONE PROCESSING SYSTEMS

[75] Inventors: Bruce O. Anthony, Jr.; Glenn D. Batalden, both of Rochester; Glen R. Mitchell, Pine Island; Phillip C. Schloss; David K. Wells, both of Rochester, all of Minn.

[73] Assignee: International Business Machines Corporation, Armonk, N.Y.

[21] Appl. No.: 745,546

[22] Filed: Jun. 17, 1985

[51] Int. Cl.⁴ .............................................. G06F 15/16
[52] U.S. Cl. ..................................................... 364/200
[58] Field of Search ........................ 364/200 MS File

[56] References Cited

U.S. PATENT DOCUMENTS

| | | | |
|---|---|---|---|
| 4,511,965 | 4/1985 | Rajaram | 364/200 |
| 4,575,793 | 3/1986 | Morel et al. | 364/200 |
| 4,590,556 | 5/1986 | Berget et al. | 364/200 |
| 4,591,978 | 5/1986 | Peterson et al. | 364/200 |

Primary Examiner—Gareth D. Shaw
Assistant Examiner—Rebecca L. Adams
Attorney, Agent, or Firm—J. Michael Anglin

[57] ABSTRACT

Two different data-processing systems are interconnected into a composite system by a shared memory in the address space of each, and by a virtual channel which generates interrupts so that each system can control the other. Each system can execute standalone programs. In addition, one of them acts as an emulated terminal for the other, and also as a system console for the other.

11 Claims, 4 Drawing Figures

COMPOSITE DATA-PROCESSING SYSTEM USING MULTIPLE STANDALONE PROCESSING SYSTEMS

BACKGROUND OF THE INVENTION

The present invention relates to electronic data processing, and more particularly concerns multiple coupled data-processing systems.

Data-processing systems of all kinds continue to become physically smaller. This is especially true of systems generally referred under the terms minicomputers, small business computers, or department computers. The IBM System/36, for example, has models about the size of a desk and about the size of a two-drawer file cabinet. At the same time, the already physically small systems known as personal computers continue to become more powerful, as powerful as some of the small business systems.

One of the major limitations to the miniaturization of systems in the small business category is the requirement of this type of system for a system console and other special kinds of peripheral devices. Most personal computers are highly integrated systems without much of this extra baggage.

It is still desirable, however, to construct smaller models of the business-computer type. Many application programs are available for them which are not available for personal computers. Migration to larger systems is facilitated when the capacity of the small business system is exceeded, since application programs need not be rewritten or repurchased.

SUMMARY OF THE INVENTION

The present invention combines the advantages of a personal computer and a business-type computer by combining the two so as to allow the personal computer to assume several different functions for the business computer, such as an emulated workstation terminal and a system console. The business computer can then be made physically smaller without being overwhelmed by its peripheral equipment. In addition, the present invention allows each computer to execute application programs in its own language, even at the same time.

Broadly speaking, the invention is a composite data-processing system having a business-computer host system interconnected to a personal-computer auxiliary system so that the latter can perform multiple functions for the former, as well as executing its own application programs. A dual-port memory appears in the address space of each system, so that data, commands, even whole programs can be transferred directly between the two systems. Among other things, this allows each system to use the I/O devices attached to the other. Also, a "virtual channel adapter" connects the two systems. This is an adapter connected as an I/O-terminal controller to the host system, but, instead of controlling an actual workstation terminal, it activates an emulator in the auxiliary system which effectively converts that system temporarily into a workstation terminal for the host system. The actual terminal commands to be emulated and their data blocks move from the host system to the auxiliary system via the dual-port memory. Furthermore, the auxiliary system can act as a system console for the host system, thus eliminating the hardware otherwise required for that function. A service adapter in the host system is connected to transfer console or service data directly as an I/O device of the auxiliary processor, allowing a service-panel program in the latter to perform any console function.

DESCRIPTION OF THE PREFERRED EMBODIMENT

Figure 1:
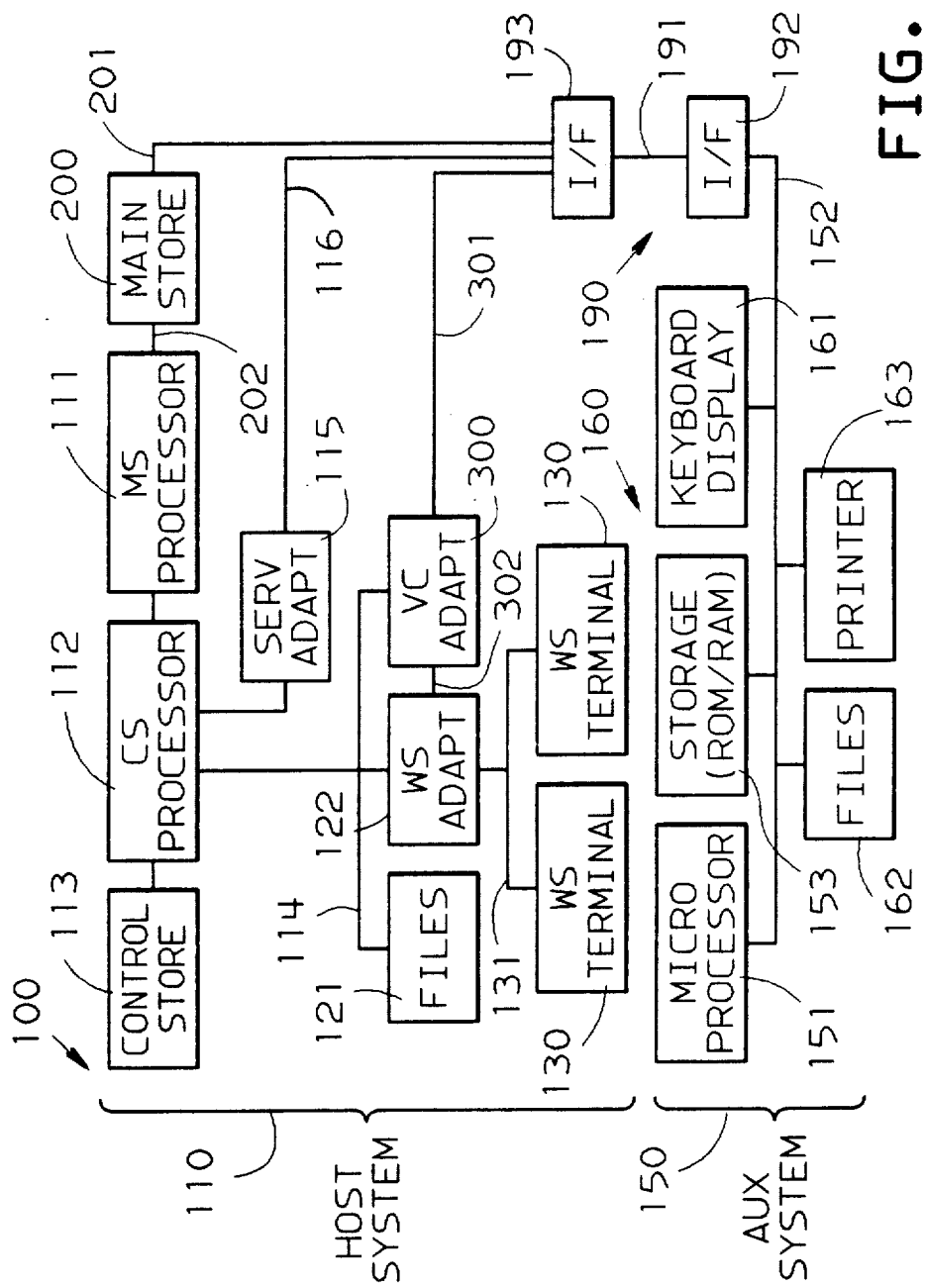
FIG. 1 is a high-level block diagram of a data-processing system according to the invention.

FIG. 1 shows an overall composite data-processing system 100 according to the invention. Overall system 100 is made up of two component systems 110 and 150, each of which is a complete, stand-alone data processing system capable of executing programs without assistance from the other. For most purposes, system 110 is preferably a multi-user higher-power unit, and will be referred to as the "host" system; system 150 is normally a single-user lower-power unit, and will be called the "auxiliary" system. In this representative embodiment, host system 110 is a four-user version of the publicly available IBM System/36 in a desktop package, while auxiliary processor 150 is a single-user IBM Personal Computer, model 5150 (PC1), 5160 (PC-XT), or 5170 (PC-AT). Interconnection means 190 ties the two systems together.

The major units of host system 110 are conventional, and are described in publicly available references such as U.S. Pat. No. 4,077,060 to R. E. Bodner et al. and the "IBM 5360 Maintenance Information Manual". Briefly, system 110 has two processors. Main-store processor (MSP) 111 executes application programs and high-level operating-system tasks in System/36 machine language, as described in the publication "System/36 Concepts and Programmer's Guide". Control-store processor (CSP) 112 is programmed to perform low-level operating-system commands and device-control operations. (For purposes of the invention, however, MSP 111 and CSP 112 together are considered the processing engine of system 110.) MSP 111 accesses System/36 code and data from read/write main store 200 via lines 202 and passes data to and from CSP 112. Main store 200 is modified in order to carry out the invention in that it has a second port for transferring data via bus 201 to and from auxiliary system 150. CSP 112 executes code from read/write and read-only control store 113, and controls a channel bus 114 for passing data to and from input/output (I/O) devices. A conventional service adapter 115 contains logic for causing CSP 112 to carry out diagnostic operations in system 110. Channel 114 connects to conventional devices, for example disk files 121 and adapter 122 for controlling multiple workstations such as IBM 5250 display terminals 130 connected via a twinaxial cable 131. A new type of device, virtual channel adapter 300, appears to channel 114 to be merely another device like adapter 122, but it manipulates control signals on busses 114 and 301 to effect data transfers to and from auxiliary system 150 on bus 201.

Auxiliary system 150 is described in the publication "IBM Personal Computer Technical Reference Manual". Microprocessor 151 serves as the processing engine controlling backplane bus 152. Storage 153, containing both read/write and read-only memory, holds executable code and data for both application programs and an operating system. I/O devices, such as keyboard/display 161 and disk files 162, connect directly to bus 152. I/O device 161 preferably has physical characteristics similar to those of the IBM 5250 terminals attached to host system 110; its operation, however, is completely incompatible with those terminals, and they cannot be substituted for each other except through the use of an emulator in the manner to be described.

Code executed in microprocessor 151 is in machine language for the Intel(®) 8088 or 80286 microprocessor; the instruction set of this language has no relation to the instruction set of MSP 111 mentioned above. That is, the invention requires no compatibility whatsoever between the programs of systems 110 and 150. In fact, even the character sets are different: host system 110 uses EBCDIC characters, while auxiliary system 150 uses an extended ASCII set.

In the present context, the term "operating system" broadly refers to a program for controlling the physical resources of a processing system, while an "application program" carries out a processing task under the control of a user of the system, usually involving the transformation of data supplied or specified by the user.

Interconnection means 190 has a cable 191 containing the address, data, and some of the control lines of bus 152, repowered through a simple interface unit 192. Another interface unit 193 in system 110 repowers and distributes the relevant cable signals to busses 201 and 301 for main store 200 and virtual channel adapter 300. Unit 193 also contains conventional decoder circuits for detecting certain control-signal combinations representing particular locations in the I/O address space of microprocessor 151; these will be specifically pointed out under FIGS. 2 and 3. Lines 116 connect service adapter 115 to interface 193 such that auxiliary system 150 can access this adapter as an ordinary device in its I/O address space, and can transfer data in both directions through lines 116 between adapter 115 and system 150.

Figure 2:
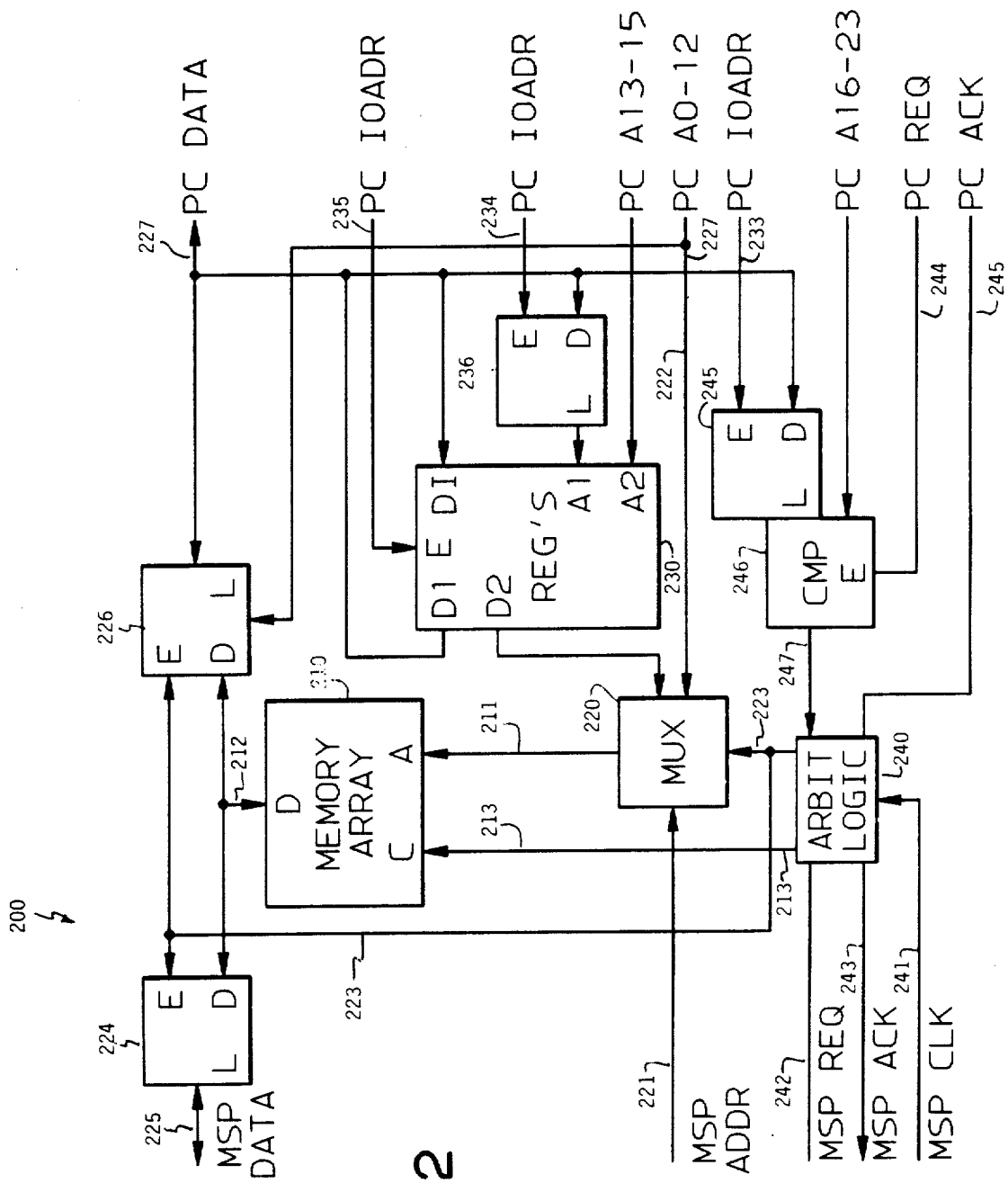
FIG. 2 shows the dual-port memory 200 of FIG. 1 in greater detail.

FIG. 2 details the main-store memory 200 of FIG. 1. In previous System/36 models, main store 200 is a conventional single-port memory coupled directly to MSP 111, FIG. 1. To serve the purposes of the present invention, main store 200 is converted to a dual-port configuration and tied to both MSP 111 of host processor 110 (by port 202) and to bus 152 of auxiliary processor 150 (by port 201).

The dual-port modification by itself uses known techniques. A 256K-word by 16-bit (plus two parity bits) memory array 210 has address input 211 and bidirectional data lines 212. System 110 has a 16-bit data bus, and system 150 communicates over means 190 with an eight-bit data bus. Address bus 211 contains 21 lines, so that array 210 can be increased to 2M bytes if desired. Control signals 213 provide conventional cycle timing functions: row and column address strobes (RAS/-CAS), read/write control (R/W), output enable (OE), and so forth. Multiplexer 220 switches address inputs 211 between address lines 221 from host system 110 and lines 222 produced from auxiliary system 150, in response to a control bit 223. Bit 223 also switches memory data from one system to the other by gating lines 212 through latches 224 to MSP data lines 225 for one value of the control bit, and by gating these lines through latches 226 to PC data lines 227 for the other value. Because bus 227 is only eight bits wide, the low-order bit A0 of the PC address gates either the upper or the lower byte of lines 212 into lines 227.

In this example embodiment, MSP address lines 221 of host system 110 can access any location in memory 210 directly. To auxiliary system 150, however, memory 210 preferably appears as a 64K-byte window in its 1M-byte address space. This is achieved by a bank of eight 8-bit translation registers 230. A memory address from system 150 is placed on lines 222 as follows. The low-order thirteen bits PC A0-A12, from bus 201, go directly to the low-order thirteen bits of lines 222. The next higher three bits PC A13-A15 select one of the eight registers 230 via register-address input A2, which supplies the high-order eight memory-address bits to multiplexer 220. This implementation allows the 64K-word window in system 150 to be split into eight 8K-word segments, each of which can start at any 8K-word boundary in memory 210.

Arbitration logic 240 apportions memory-access requests so that each port is effectively invisible to the other. Logic 240 is locked to MSP clock 241 to generate the memory control signals 213. (Any clock would do; this one was chosen because main store 200 is physically located within system 110.) System 110 requests a memory access on port 202 by asserting MSP REQ 242. If no memory cycle is in progress on port 201, logic 240 carries out a memory cycle on lines 213 and sets signal 223 to apply MSP address 221 to memory 210 and to transfer MSP data 225 to or from the addressed location. MSP ACK 243 acknowledges completion of the access to system 110 at the normally expected time. System 150 similarly requests a memory access on port 201 by asserting PC REQ 244 for an address within the 64K-byte window. Eight-bit latch 245 holds the base address of the window; comparator 246 then raises line 247 when the high-order PC-address lines PC A16-A23 match the contents of latch 245, when enabled by PC REQ 244. If no memory cycle is in progress on port 202, logic 240 carries out a memory cycle on lines 213 and sets signal 223 to apply translated PC address 222 to memory 210 and to transfer PC data 227 to or from the addressed location. PC ACK 245 acknowledges completion of the access to system 150 at the normal time. If an MSP cycle from port 202 is in progress when port 201 requests a PC access, logic 240 merely holds the PC REQ signal until the cycle has completed, then initiates a PC cycle and asserts PC ACK 245 when that cycle completes. A similar operation occurs when an MSP request occurs during a PC cycle. For simultaneous requests, preference is given to MSP requests. Thus, the only effect of each memory port on the other is to delay the acknowledgement signal, 243 or 245 of one port when the other is using the memory. That is, memory 200 simply appears to be somewhat slower than usual to the other port. Neither system can be locked out of memory 200 for more than one cycle of the other system. If both systems 110 and 150 present continuous requests, for example, the described operation of logic 240 causes memory accesses to alternate between them.

Auxiliary system 150 controls the locations of the 64K-byte window in the address space of system 150, and also controls the locations of the 8K-byte segments in the space of main-store memory array 210. Interface unit 193 detects three addresses in the I/O space of microprocessor 151. When microprocessor 151 accesses a first of these I/O addresses, line 233 enables it to write an eight-bit base address of the 64K-byte window into latches 245 from PC data lines 227. The second I/O address causes line 234 to enable three-bit latch 236 to receive from PC data lines 227 a designation of one of the eight registers 230. The third I/O address, detected by line 235, enables registers 230 to select the register specified by latches 236 via alternate-address input A1, and then to load the contents of PC data lines 227 into the selected register via data-input lines DI. The contents of registers 230 can be read out to PC data bus 227 through alternate data output D1, also enabled by line 235. Latches 245 can also be read out to PC data lines 227.

Figure 3:
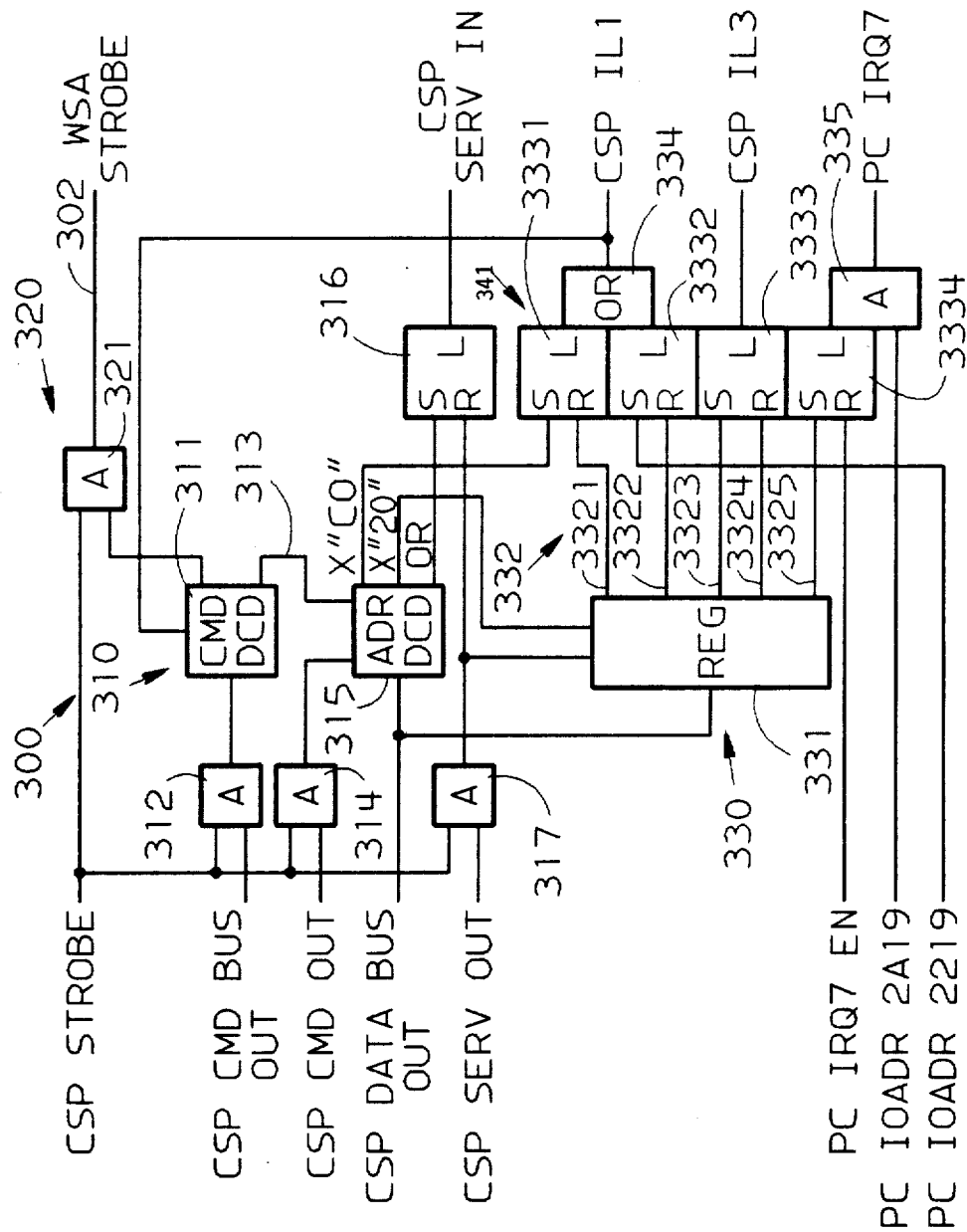
FIG. 3 shows the virtual channel adapter 300 of FIG. 1 in greater detail.

FIG. 3 details the virtual channel adapter 300 of FIG. 1. Channel 300 is also described in commonly assigned U.S. patent application Ser. No. 745,728, filed on June 17, 1985, by B. O. Anthony, T. M. Heise, and F. P. Sheppard, entitled "Emulator for Computer System Input-Output Adapters". To simplify the diagram of FIG. 3, all lines labelled "CSP" connect to channel bus 114, FIG. 1, while all lines labelled "PC" connect to bus 301. The other units 121–122 attached to channel bus 114 generate interrupts to CSP 112 and to their I/O devices, and transfer data to and from those devices. Although virtual channel adapter 300 could alternatively be constructed to transfer data directly to and from auxiliary system 150 in the same manner, it instead only generates interrupts to both systems; these interrupts cause auxiliary system 150 to transfer the necessary data by way of shared main store 200.

Channel logic unit 310 performs the functions of decoding addresses and data from channel bus 114, and of handshaking with the control signals of that bus. A normal cycle of bus 114 begins with a channel command on lines CSP CMD BUS OUT, gated to command decoder 311 by asserting the CSP STROBE line to AND 312. Line 313 from the command decoder, along with CSP CMD OUT (also gated by CSP STROBE, by AND 314), enables address decoder 315 to receive the contents of CSP DATA BUS OUT. Asserting CSP CMD OUT signifies a "start command" condition in channel 114. If the CSP DATA BUS OUT contains X'20' or X'C0' (i.e., decimal '32' or '192'), latch 316 is set. This asserts line CSP SERVICE IN to channel 114, to indicate that a data transfer is in progress. When the data transfer has been completed, CSP SERVICE OUT, gated by CSP STROBE in AND 317, detects an "end command" condition, and resets latch 316, thus releasing CSP SERVICE IN. This much of the channel operation would be performed by a conventional adapter such as 121 or 122 in FIG. 1.

Workstation-enable logic 320 intercepts the CSP STROBE signal to the channel adapter 122 which serves the real workstation terminals 130. That is, adapter 122 is modified in that it does not receive a CSP STROBE line directly from bus 114, but rather obtains it from virtual channel adapter 300 via line 302, as indicated in FIG. 1. When the contents of command decoder 311 signifies that the channel means to communicate with a real terminal 130, AND 321 gates the CSP STROBE line to WSA STROBE line 302 to adapter 122. Otherwise, channel 114 is attempting to communicate with an emulated terminal; in that case, WSA STROBE line 302 is blocked, and only virtual channel adapter 300 can respond to the command.

The overall function of interrupt-control logic 330 is to respond to channel 114 and to control signals from interconnection means 190 to generate interrupt signals both to host system 110 and to auxiliary system 150. Register 331 is enabled to receive the contents of CSP DATA BUS OUT when address decoder 315 contains X'20' and CSP SERVICE OUT is active. Register output lines 332 set or reset latches 341 to assert or release various interrupt lines, in conjunction with signals from logic 310 and from auxiliary system 150. More specifically, latch 3331, when set by the X'C0' output of address decoder 315, produces a priority-level "1" interrupt signal CSP IL1 through OR 334 to channel 114. This signal also causes command decoder 311 to allow enable logic 320 to pass commands to adapter 122. Latch 3331 can be reset with a bit on line 3321. Latch 3332 can also produce CSP IL1 signal via OR 334. This latch is set by auxiliary system 150, by asserting I/O address X'2219'; this address is decoded in interface unit 193, FIG. 1, to line PC IOADR 2219 in FIG. 3. Line 3322 resets latch 3332. Latch 3332 allows system 150 to interrupt system 110. Latch 3333 is set and reset by lines 3323 and 3324 from register 331. This latch controls interrupt CSP IL3. This interrupt level allows CSP 112 to interrupt itself. Latch 3334 is set by line 3325, and can be cleared or held disabled by line PC IRQ7 EN from interface unit 193. Latch 3334 generates interrupt level "7" on line PC IRQ7 when set, and returns it to system 150 via AND 335 to interface unit 193. System 150 can selectively decouple itself from system 110 by raising line PC IOADR 2A19. It does this by accessing I/O address X'2A19', which is decoded to this line in interface 193.

Virtual channel 300 begins operation when CSP 112 sends a workstation command on channel bus 114. Channel 300 then sends interrupt CSP IL1. CSP code for this interrupt level determines whether the workstation being addressed is real or emulated. If it is real, then the command is reissued. The CSP IL1 signal acts on enable logic 320 through decoder 311 to cause the reissued command to go to adapter 122 rather than to channel virtual 300. But, if an emulated workstation is addressed, CSP code sets register 331 to assert interrupt PC IRQ7. Next, code for this interrupt level in system 150 transfers the command information from the appropriate locations in main store 200 to other locations in the memory 153 where the emulator expects to find it. Then, the microprocessor interrupt code turns off PC IRQ7 by releasing PC IRQ7 EN and starts the conventional emulator code. At any time after PC IRQ7 is issued, CSP code can turn off the CSP IL1 interrupt by issuing the appropriate bit toine 3321 of register 331.

Figure 4:
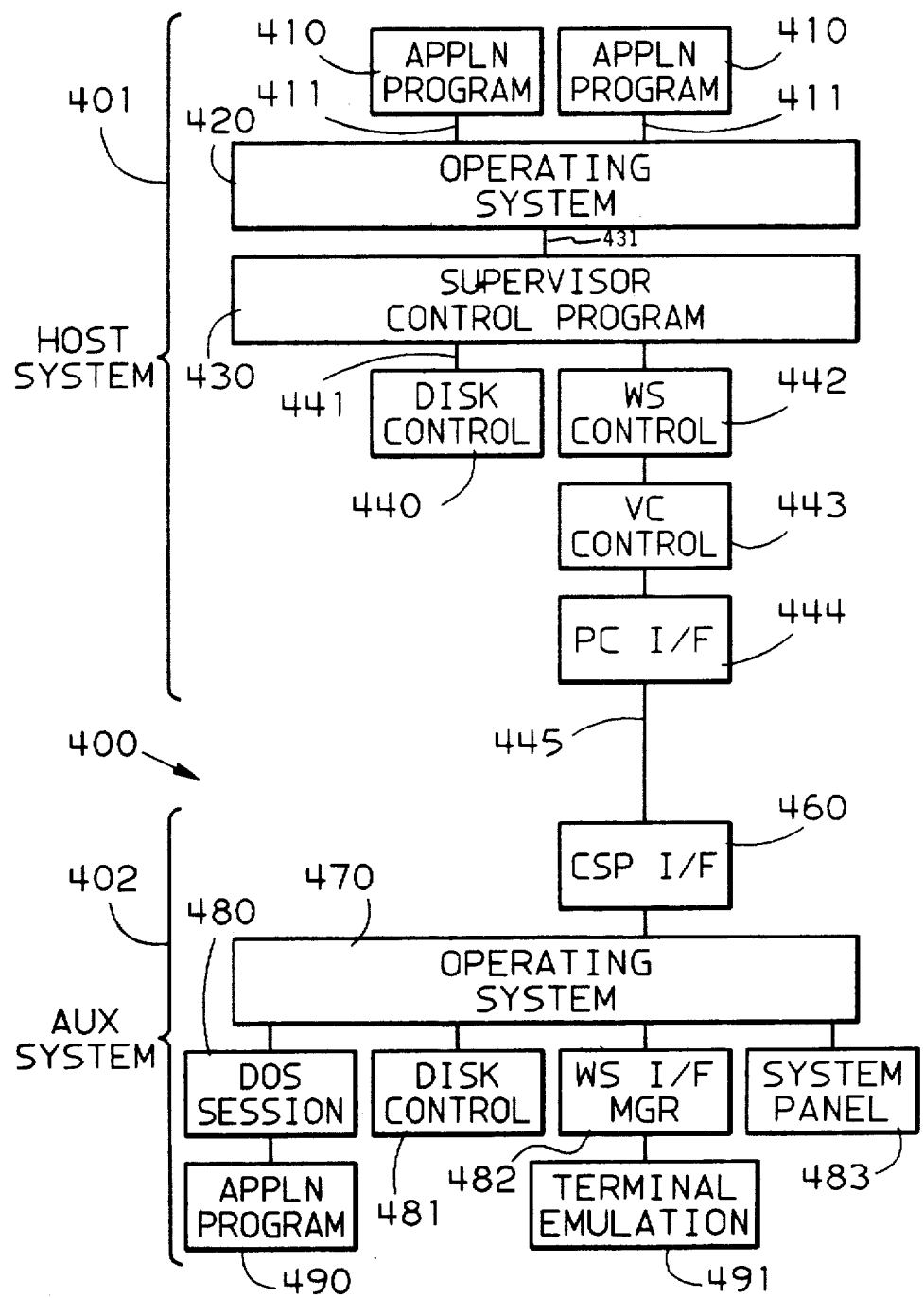
FIG. 4 is a block diagram showing the interactions of the programming components used in the system of FIG. 1.

FIG. 4 illustrates the relationship of the program components 400 relevant to the invention. FIG. 4 is not a flow chart, but rather a schematic showing how the various components exchange data with each other.

The components indicated by the brace 401 reside in host system 110. Application programs 410 and operating-system program 420 are comprised of code in the machine language of the System/36 host system 110, and data in its character/numeric formats. These programs reside in main store 200 and are executed in an entirely conventional manner by MSP 111, FIG. 1. They communicate with each other by means of data conceptually indicated as lines 411. As described under FIG. 1, lower-level operating-system tasks are performed by supervisor control program (SCP) 430, residing in control store 113 and executed by CSP 112. Communication between components 420 and 430 is by data 431 transferred between MSP 111 and CSP 112 just as in the conventional System/36. Conventional disk control module 440 receives commands and data 441 from SCP 430 for operating flexible and fixed disk files 121, FIG. 1. Other standard modules, not shown, control further peripheral devices in a similar manner. Workstation-control module 442 handles commands and data for multiple workstation displays and printers connected to cable 131, FIG. 1, as in previous models of the publicly available System/36.

Virtual-channel control module 443 contains the previously described code for operating virtual channel adapter 300. When module 443 detects a command sent to or received from an arbitrary channel address representing a workstation emulated by system 150, it activates PC interface 444. WS control 442 places data blocks for the command at conventional addresses in main store 200 and, when appropriate, passes control to PC interface 444 which then causes virtual channel adapter 300 to generate an interrupt to auxiliary system 150, as described under FIG. 3. (To reduce traffic on interconnection means 190, several commands may be blocked together and sent as a unit in response to a poll.) The format of these data blocks is substantially the same as that used for a publicly available program for the IBM Personal Computer which causes its display and printer to emulate an IBM 5250 workstation terminal. Line 445 symbolizes the transmission of the data blocks to auxiliary system 150.

CSP interface module 460 resides in storage 153 of auxiliary system 150. Microprocessor 151 executes it upon receiving the appropriate interrupts on cable 191 from virtual channel adapter 300. The overall function of CSP interface 460 is to locate the data and commands in dual-port main store 200. Operating system 470 is a multi-tasking supervisor running on top of the publicly available Personal Computer Disk Operating System (PC-DOS), Version 3.1, for the IBM Personal Computer. Its conventional functions include running a PC-DOS session manager 480 for normal application programs 490, and handling device-control modules such as 481 for operating disk files 162, FIG. 1. Block 480 can also communicate directly with display 161 and printer 162, so that at least some application programs 490 can run concurrently with the emulator. Workstation-interface manager 482 interfaces to command and data blocks sent by block 443 to control display 161 and printer 163 attached to system 150. The display 161 and printer 163 are controlled by the previously mentioned IBM 5250 emulator program 491. Because PC interface 444 formats the data blocks in main store 200 essentially as the emulator expects them, very little of the emulation code needs to be rewritten. Indeed, an IBM Personal Computer running emulator 491 may be connected to bus 131, FIG. 1, to operate as a workstation terminal 130 under the direct supervision of workstation control 442. That is, the overall system 100 could include multiple personal computers, one functioning as auxiliary system 150 under the invention, and one or more functioning as terminals 130 in a conventional manner.

System panel 483 acts as a system console and diagnostics processor for host system 110. It performs the same functions as does the code residing in the panel microprocessor of the previous System/36 models, such as reading from and writing to registers in MSP 111, tracing program execution, and so forth. That is, the execution of system panel 483 by microprocessor 151 converts system 150 pro tempore into a console for host system 110. And, because all the facilities of auxiliary system 150 are available to panel 483, the functions it provides can be more elaborate than was heretofore possible. For example, previous models of the System/36 could display only a single MSP register at a time on a segmented-digit display; the present implementation, having a multi-line display 161 at its disposal, can display the entire set of registers at once. Panel 483 accesses the conventional service adapter hardware 115 as a device in the I/O address space of microprocessor 151, as explained under FIG. 1. Thus, host system 110 is not aware of any changes in the implementation of its panel functions, and no code in modules 420 or 430 need be modified to support this new console.

In summary, the overall view of FIG. 1 shows a composite data-processing system which connects two stand-alone systems such that either may be used singly—and simultaneously—to execute applications programs written for it, one may be used as a whole to provide functions—such as a terminal and a system panel—for the other, and the I/O devices of either may be accessed by the other. These functions can be achieved with a wide range of processing systems, and require few modifications to systems which have an otherwise conventional design.

We claim as our invention:

1. A composite data-processing system, comprising
   (a) a host-processing system capable of executing host application programs independently of any other processing system, including
      (1) a host-processing engine, comprising means for executing host application programs and for storing and retrieving emulation data and commands, and means for generating virtual channel activation signals.
      (2) a dual-port memory having first and second ports, said first port being accessible by said host-processing engine, for storing and retrieving emulation data and commands,
      (3) a channel bus coupled to said host-processing engine, said channel bus adapted by connection to a plurality of I/O hardware adapters for transferring I/O data and commands between said host-processing engine and a plurality of input-/output means controlled by said I/O hardware adapters,
      (4) at least one virtual channel adapter connected to said channel bus, said at least one virtual channel adapter having means for receiving virtual channel activation signals from said host processing engine, and having means for receiving and producing control signals in response thereto, for at least a first type of input/output means;
   (b) an auxiliary-processing system capable of executing auxiliary application programs independently of any other processing system, including
      (1) an auxiliary-processing engine,
      (2) a data bus coupled to said auxiliary-processing engine, said data bus adapted for connection to a plurality of devices for transferring I/O data and commands between said auxiliary-processing engine and said plurality of devices,
      (3) emulation means in said auxiliary-processing engine and coupled to said data bus, responsive to emulation control signals for causing said auxiliary-processing system to emulate said first type of input/output means;

(c) interconnection means for coupling said second port of said dual-port memory to said data bus, and for coupling said virtual channel adapter to said data bus;

whereby said virtual channel adapter may initiate emulation control signals to cause said auxiliary-processing system to emulate said first type of input/output means in said host-processing system.

2. The system of claim 1, wherein said host-system processing engine has a machine language different from that of said auxiliary-system processing engine.

3. The system of claim 1, wherein said host-processing engine further comprises
   (a) a main processor coupled to the first port of said dual-port memory, having means for executing host application programs and for storing and retrieving emulation data and commands in said dual-port memory,
   (b) a control processor coupled to said main processor and to said channel bus, having means for activating said virtual channel adapter to cause said virtual channel adapter to initiate emulation control signals.

4. The system of claim 3, wherein said host-processing system further comprises an I/O hardware adapter connected to said channel bus and to said virtual channel adapter; said I/O hardware adapter having means for receiving and producing control signals for said first type of input/output means; said virtual channel adapter having means for disabling and enabling operation of said I/O hardware adapter's means for receiving and producing control signals; and said control processor having means for controlling said virtual channel adapter means for disabling and enabling.

5. The system of claim 1, wherein sid virtual channel adapter further comprises
   (a) channel logic coupled to said channel bus for detecting commands from said host-processing engine directed to an emulated terminal;
   (b) means for signaling said auxiliary-processing engine to initiate said emulation means; and
   (c) mean for signaling said host-processing engine of the completion of an emulation.

6. The system of claim 5, wherein said auxiliary-processing engine further comprises, in response to a received signal to initiate said emulation means, and means for transferring emulated terminal commands from said dual-port memory second port to said emulation means.

7. The system of claim 5, wherein said host-processing system further comprises an I/O hardware adapter connected to said channel bus and to said virtual channel adapter; said I/O hardware adapter having means for receiving and producing control signals for said first type of input/output means; said virtual channel adapter having means for disabling and enabling operation of said I/O hardware adapter's means for receiving and producing control signals; and said control processor having means for controlling said virtual channel adapter means for disabling and enabling.

8. The system of claim 1, wherein said host-processing system further comprises a service adapter coupled to said channel bus, said service adapter having means for controlling said host-processing engine; and means for connecting said service adapter to said auxiliary-processing system data bus; and wherein said auxiliary-processing system further comprises a service panel connected to said data bus, and means for controlling said service adapter by said service panel.

9. The system of claim 1, wherein said dual-port memory is physically located in said host system.

10. The system of claim 1, wherein said dual-port memory includes register means for placing said second port at a plurality of different addressable locations accessible by said auxiliary-system processing engine.

11. The system of claim 10, wherein said dual-port memory includes means for loading said register means from said auxiliary system.

* * * * *